(12) United States Patent
Smith et al.

(10) Patent No.: US 8,598,559 B2
(45) Date of Patent: Dec. 3, 2013

(54) SYSTEMS AND METHODS FOR BEAM SPLITTING FOR IMAGING

(75) Inventors: Scot T. Smith, Winter Springs, FL (US); Michael L. Blume, Oviedo, FL (US); Kimberly M. Blume, legal representative, Oviedo, FL (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 509 days.

(21) Appl. No.: 12/804,427

(22) Filed: Jul. 21, 2010

(65) Prior Publication Data

US 2012/0018616 A1  Jan. 26, 2012

(51) Int. Cl.
*G01D 5/30* (2006.01)
*G02B 27/14* (2006.01)

(52) U.S. Cl.
USPC ......... 250/578.1; 250/216; 359/618; 359/638

(58) Field of Classification Search
USPC .......... 359/618, 638.831, 833, 834, 836, 629, 359/633, 638; 250/208.1, 578.1
See application file for complete search history.

(56) References Cited

U.S. PATENT DOCUMENTS 5,113,067 A * 5/1992 Nakai et al. ................ 250/208.1

* cited by examiner

*Primary Examiner* — Tony Ko
(74) *Attorney, Agent, or Firm* — Alston & Bird LLP

(57) ABSTRACT

Optical systems and methods in accordance with some embodiments discussed herein can receive one or more beams of light from the system's field of view. Internal optical components can then direct the beam of light, including splitting the beam of light, rotating at least one of the split beams of light, and displacing one or more of the beams of light, such that the split beams of light are parallel to each other. Each beam of light may then be directed onto at least one linear detector array. The linear detector array can transform the light into electrical signals that can be processed and presented in a human-readable display.

22 Claims, 15 Drawing Sheets

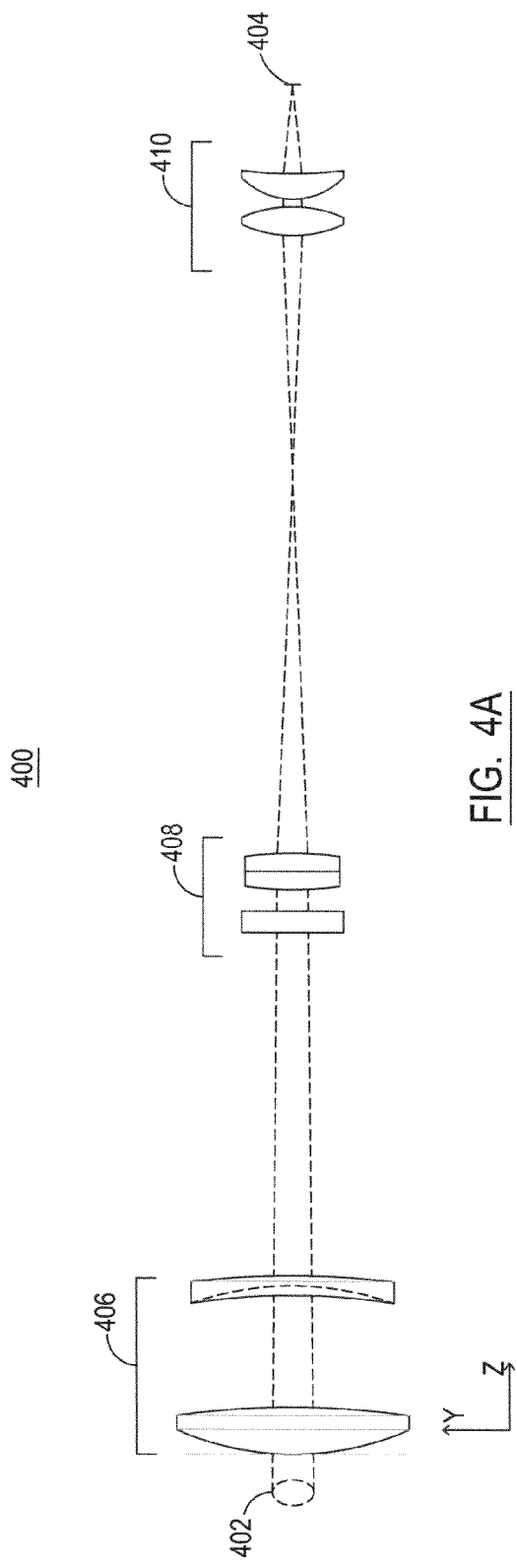
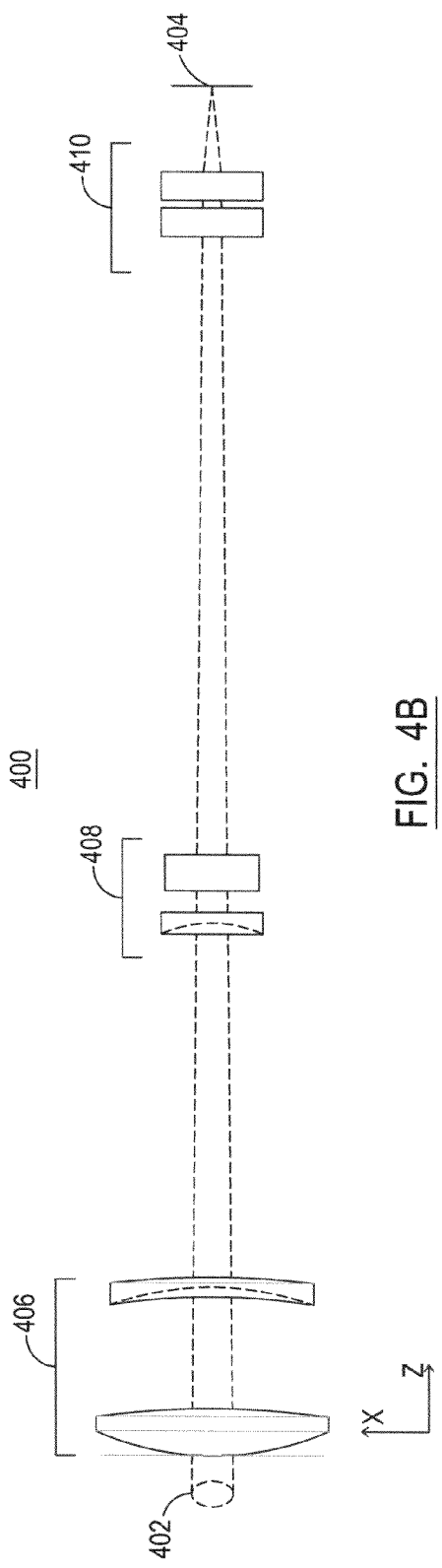

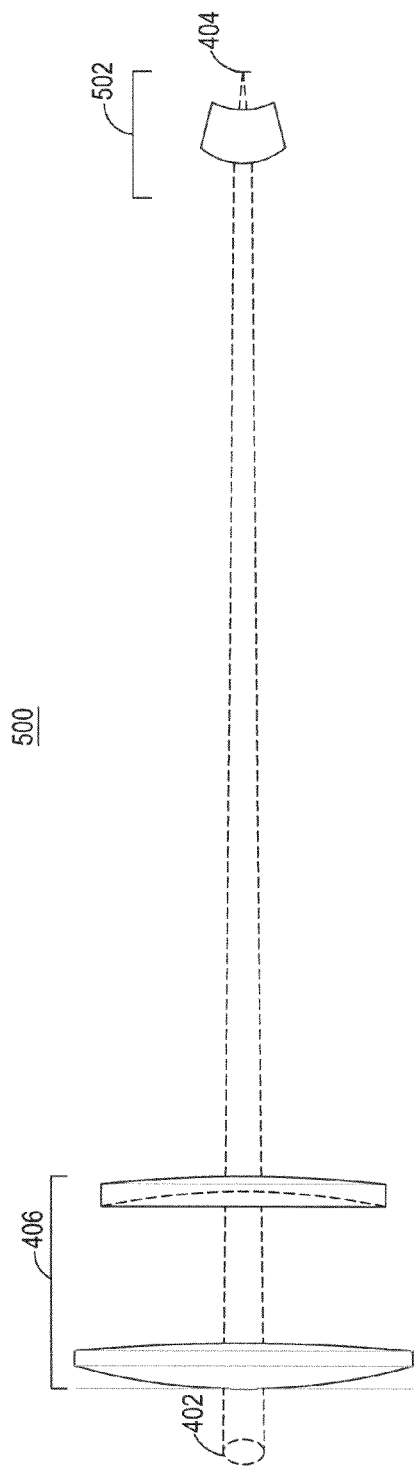
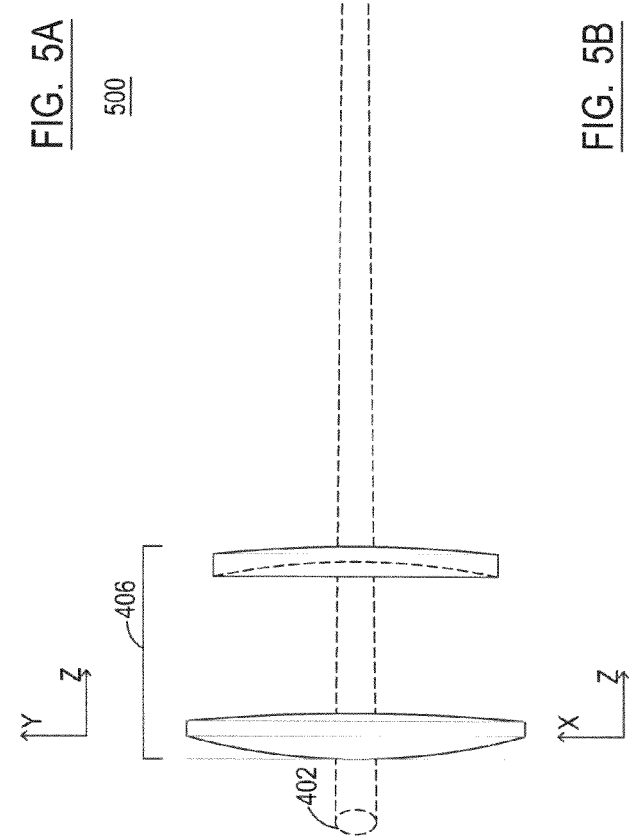
FIG. 5A
FIG. 5B

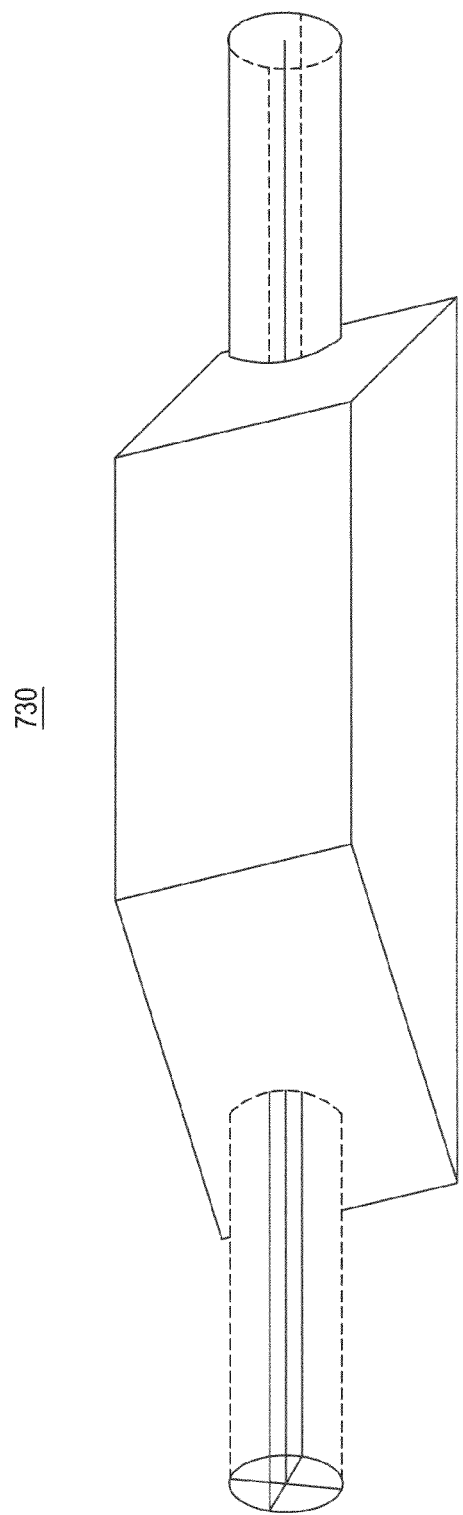

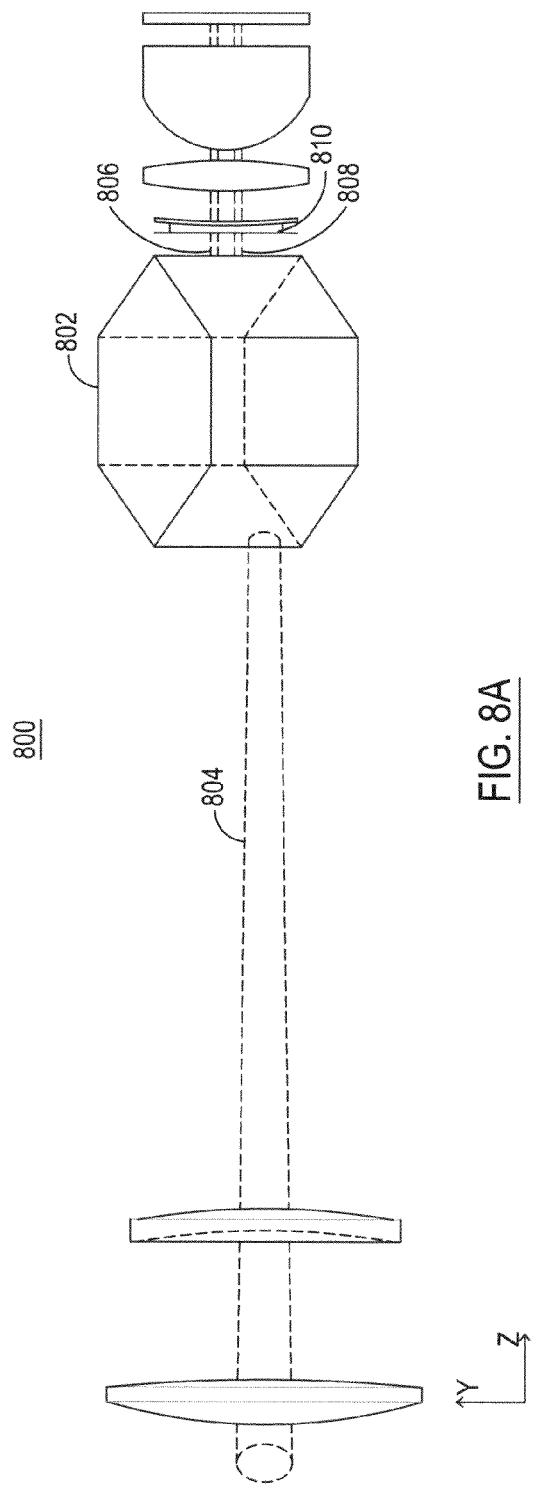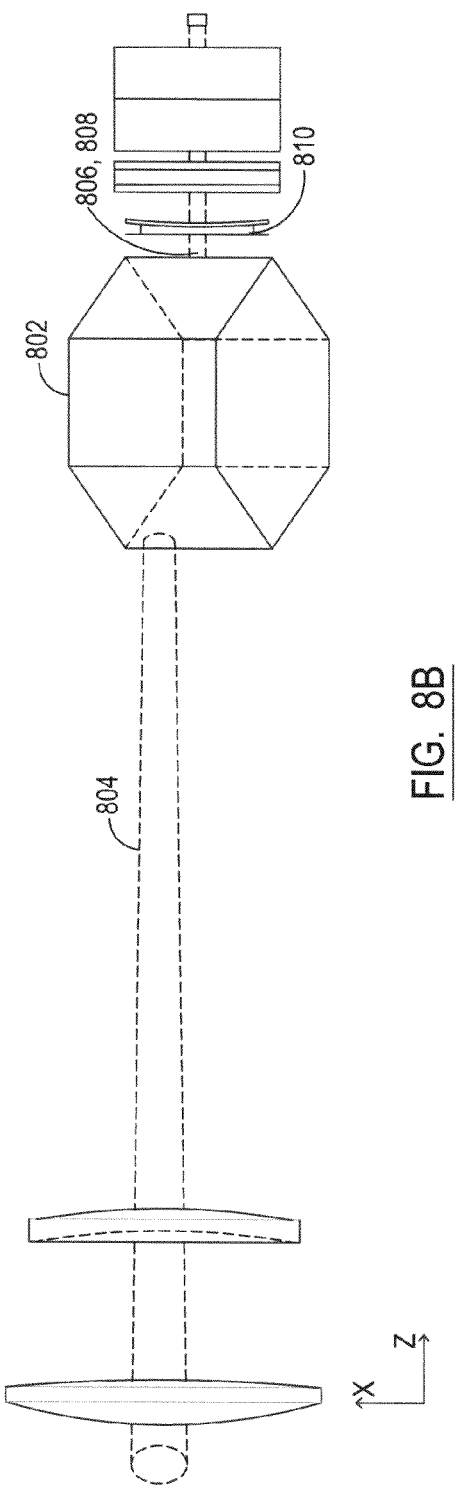

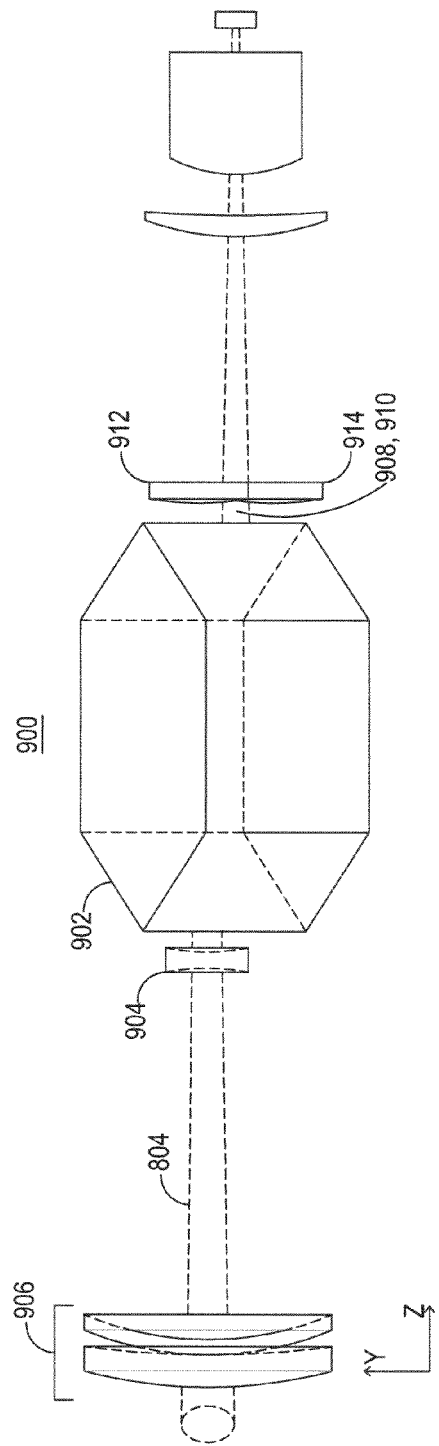
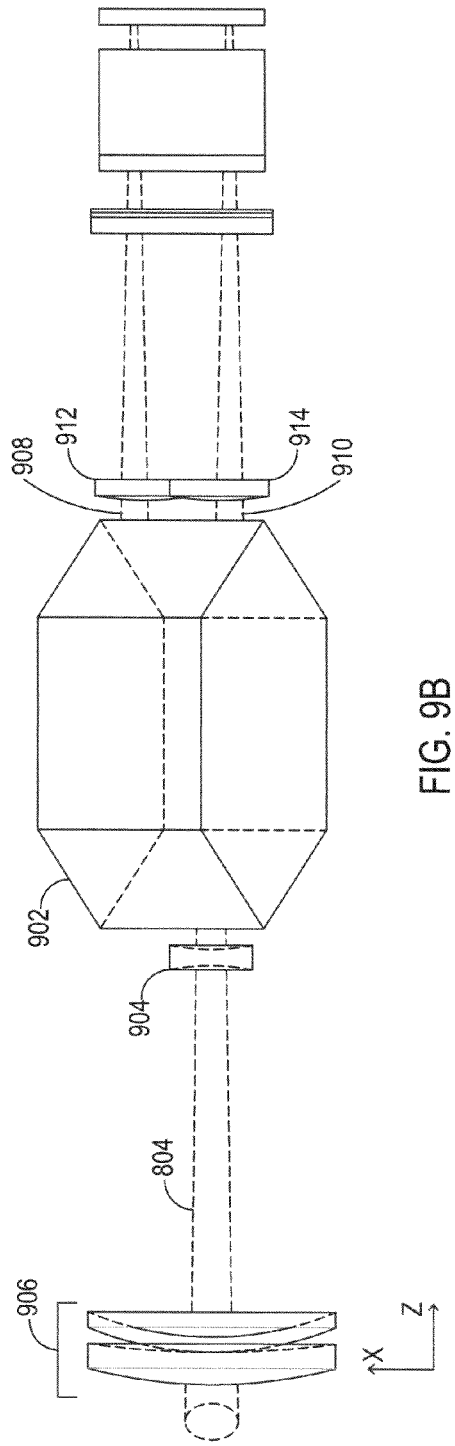
FIG. 9A
FIG. 9B

SYSTEMS AND METHODS FOR BEAM SPLITTING FOR IMAGING

FIELD

Embodiments of the present invention relates to an imager that can be configured to detect a light shining on a target and, more particularly, to apparatuses, systems, methods, computer readable media and other means for anamorphically imaging a designator spot located on the target.

BACKGROUND

For decades, militaries around the world have used laser-guided ordinances, such as laser-guided bombs and missiles. The increased accuracy and precision of laser-guided ordinances have greatly reduced collateral damage. For example, a number of "dumb" bombs were previously dropped over a relatively large area to destroy a particular building, but now a single "smart" missile can be guided to the building or even into a particular floor of the building.

In addition to the warhead and other traditional components, laser-guided ordinances include a laser detector, guidance control circuitry, and a guidance system. The laser detector can be configured to detect a laser spot, sometimes referred to herein as a "designator spot," that is created by a designator laser beam shining on and reflecting off an object. The designator spot can be of a particular wavelength that, in some instances, pulsates at a particular frequency. The ordinance's control circuitry can process an image created by the laser detector, determine the relative location of the designator spot within the laser detector's field of view, and cause the guidance system to direct the ordinance to the designator spot and into the target. The guidance system can include, for example, moveable wings and/or propulsion units.

In some instances, a laser target designator integrated in the weapon delivery system can create the designator spot. For example, an aircraft can include both a laser designator that creates the designator spot by shining a laser beam on a target, and an ordinance delivery system that delivers a laser-guided ordinance to the target.

In other instances, the laser designator can be located remotely from the weapon delivery system. For example, a person on the ground can operate a ground laser target designator, such as Northrop Grumman's GLTD II or GLTD III, which creates a designator spot that can be detected by a laser-guided ordinance. Ground laser target designators have added a new dimension to target designation by reducing collateral damage and enabling safer close air support for ground troops. However, it is still desirable to improve known ground laser target designators, improve laser detectors in ordinance, and improve laser detectors in other types of machines (such as aircraft).

BRIEF SUMMARY

Embodiments discussed herein include optical systems and components thereof, as well as methods for using and manufacturing optical components and optical systems. The optical systems can be configured to identify the location of the designator spot using one or more linear arrays of detector elements. Despite using one or more linear arrays, the optical systems can provide enough information to uniquely determine the location of one or more of the designator spots and image the designator spots in multiple dimensions.

Optical systems in accordance with some embodiments discussed herein can receive one or more beams of light within the system's field of view. Internal optical components can then direct the beams of light, including splitting each of the beams of light, rotating at least one of the split beams of light, and displacing one or more of the beams of light, such that each pair of split beams of light are parallel to each other. Each beam of light may then be directed onto at least one linear detector array.

Each initial beam of light can comprise, for example, light having one or more wavelengths and/or one or more ranges of wavelengths. Though, in some embodiments, the beams of light that initially generated by a target designator or other type of laser beam emitting device have a nearly monochromatic wavelength. The received beam of light can also be pulsating at one or more frequencies. Likewise, the light that illuminates the linear detector array(s) may have the same or similar characteristics as its corresponding initially received beam of light. The illumination characteristics can be quantified by the linear array(s) and transformed into one or more corresponding electrical signals. The corresponding electrical signals can then be sent to a processor and/or other circuitry. The circuitry can also determine the location of, for example, a designator spot based upon the detector element(s) each beam of light is illuminating. The circuitry can also cause a human-understandable image to be displayed that includes, for example, the invisible designator spot and its location within a scene.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Having thus described the invention in general terms, reference will now be made to the accompanying drawings, which are not necessarily drawn to scale, and wherein:

Figure 7A:
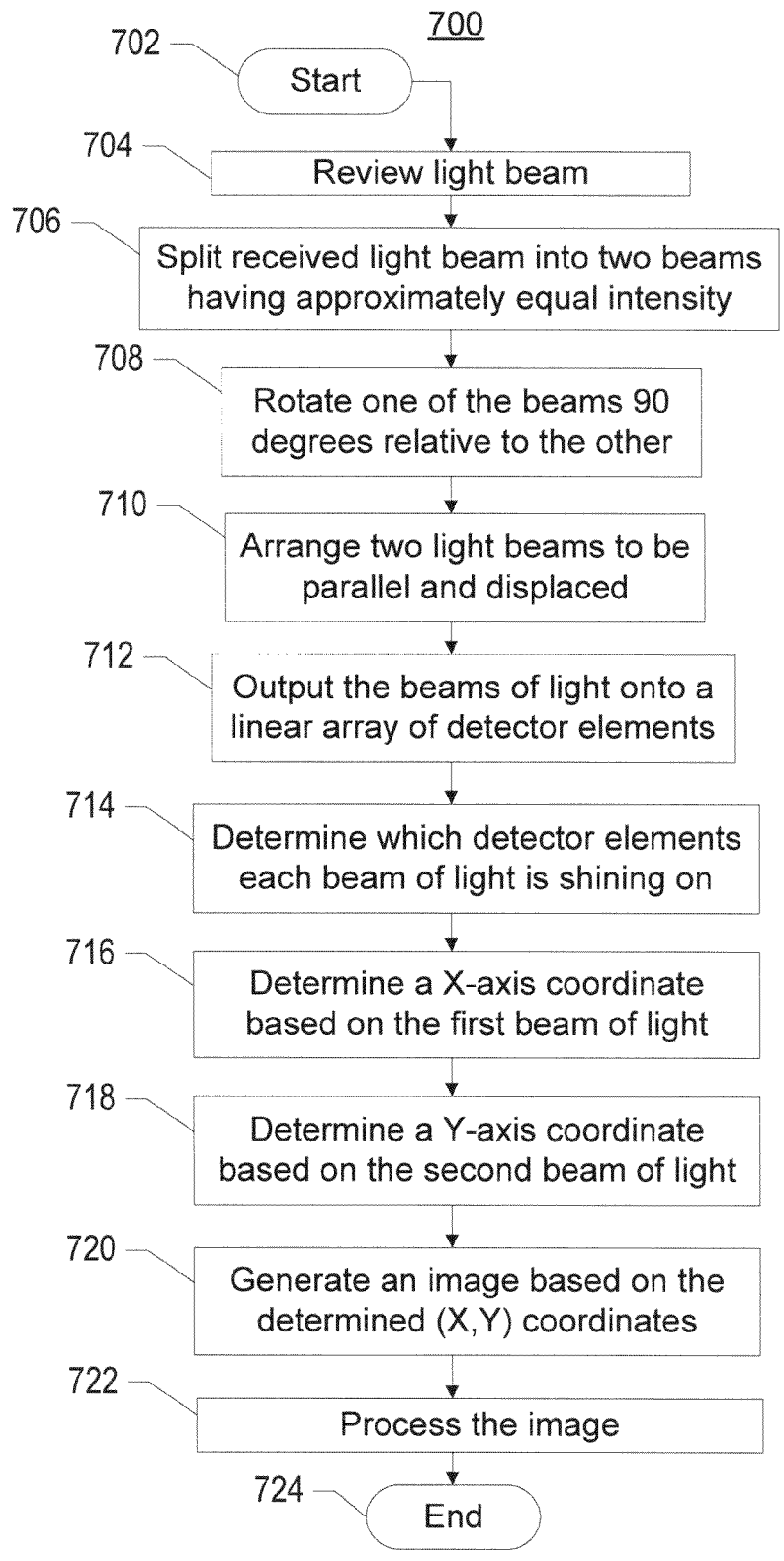
Figure 9C:
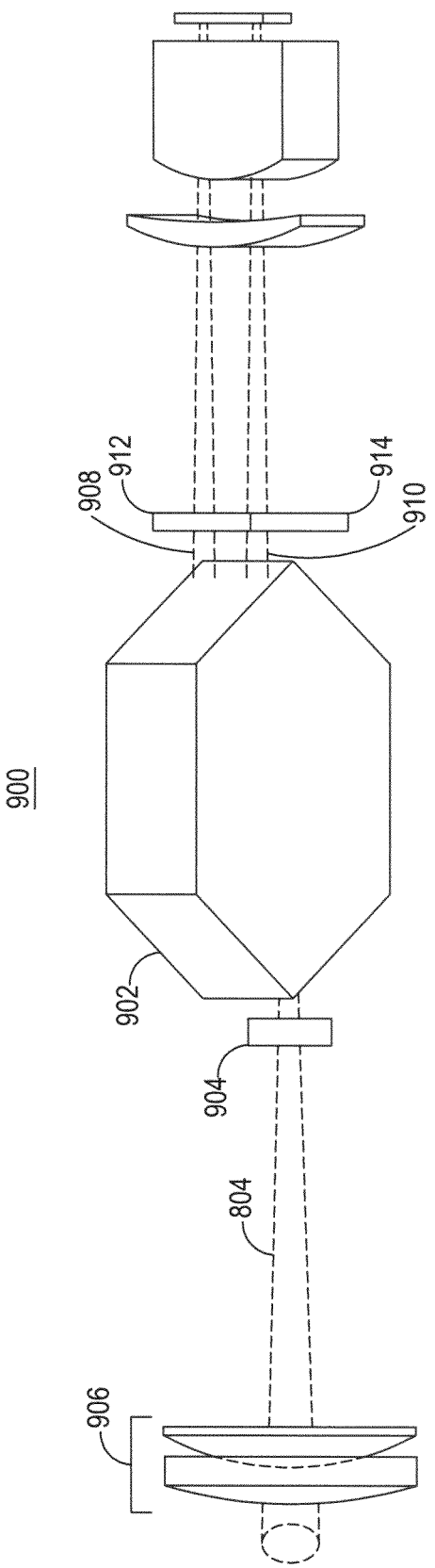
Figure 9D:
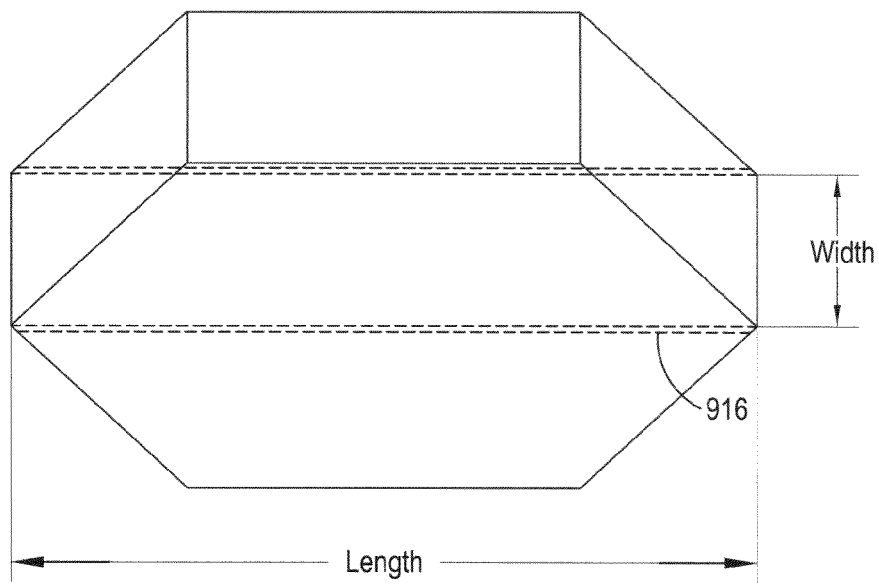
Figure 9E:
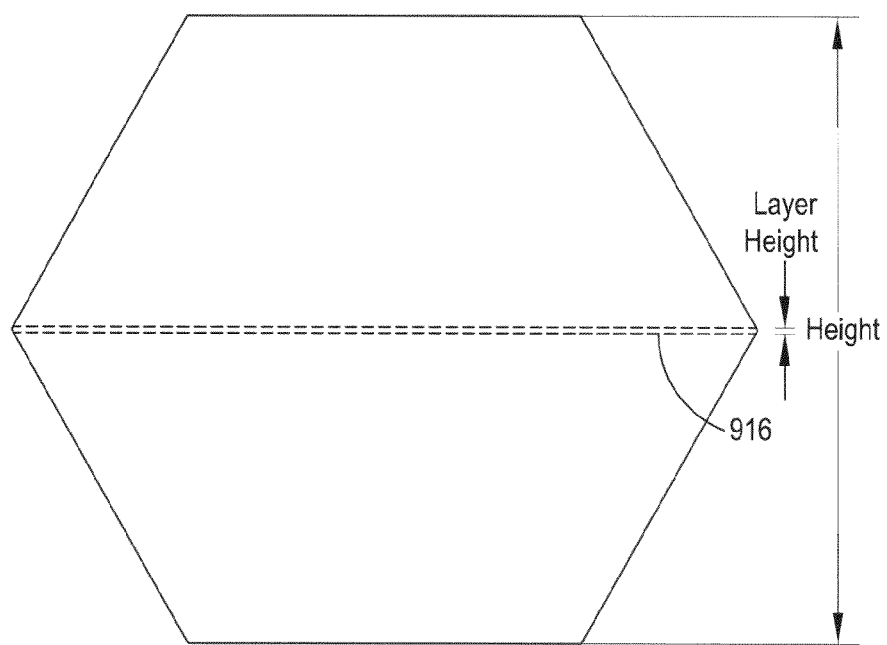
Figure 10:
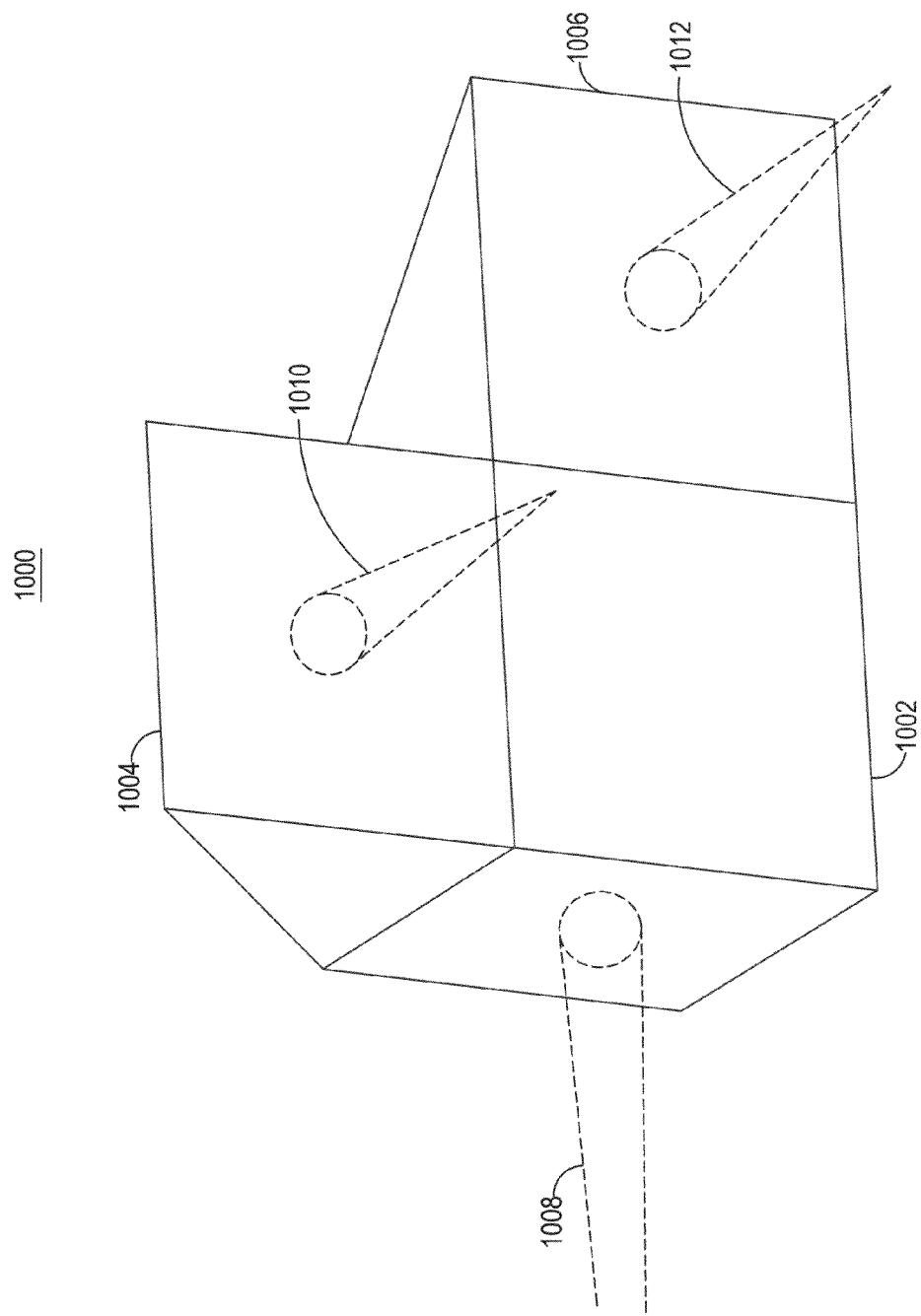
Figure 11:
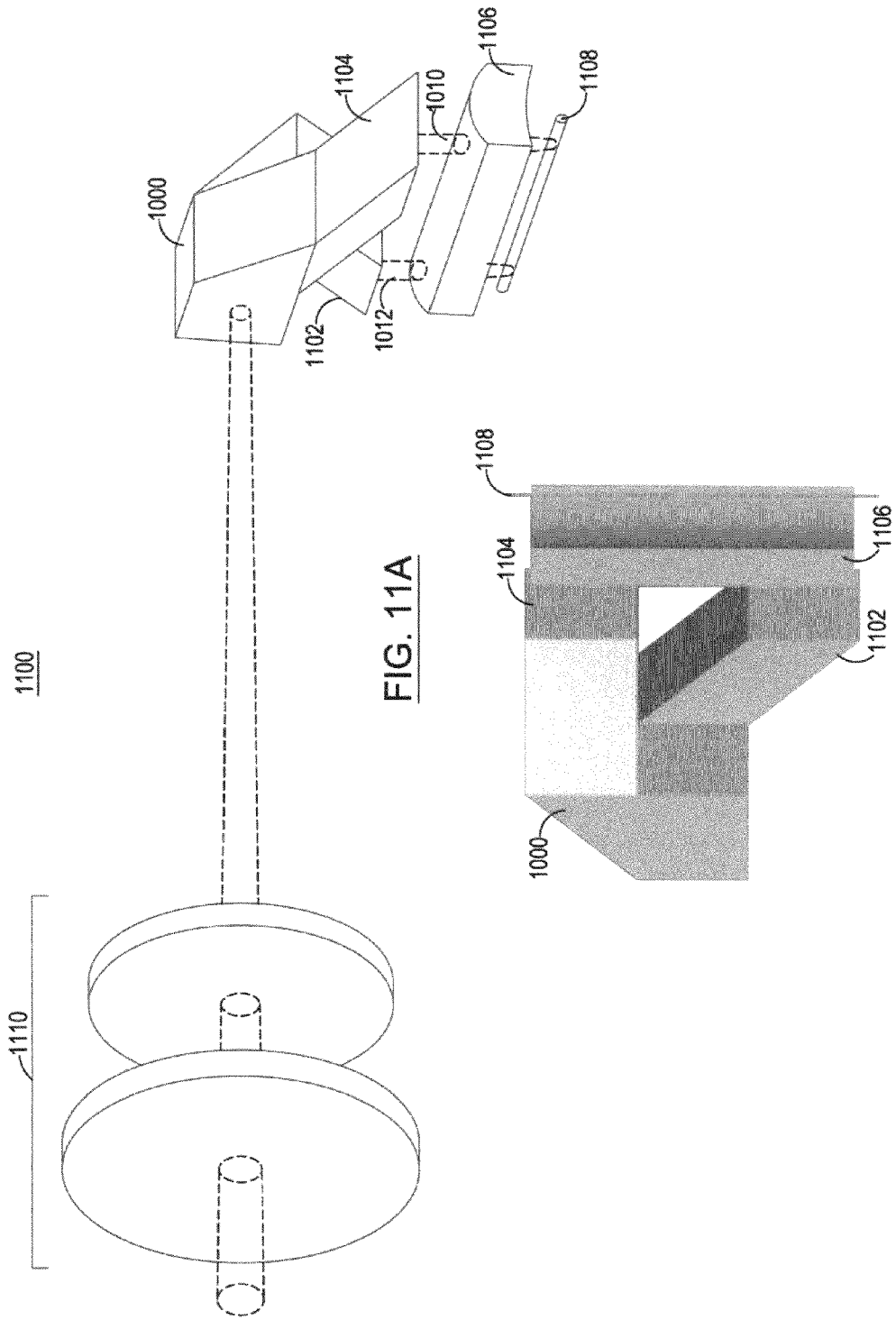
Figure 12:
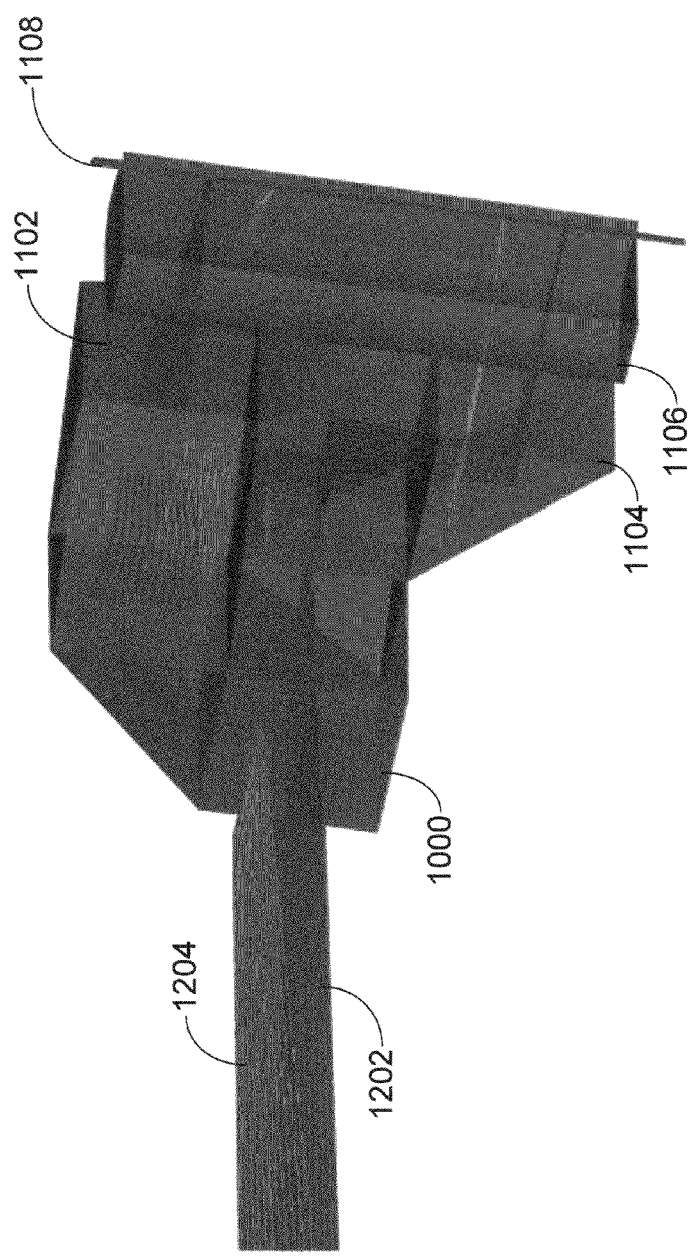

FIGS. 4A-4B respectively show a side view and a top view of components of an optical system in accordance with some embodiments discussed herein;

FIGS. 5A-5B respectively show a side view and a top view of components of an optical system in accordance with some embodiments discussed herein;

FIGS. 6A-6F show how light having three different angles of incidence may be distributed by an anamorphic relay and by a field lens;

FIG. 7A shows a process that may be executed by systems and/or their components in accordance with some embodiments discussed herein;

FIG. 7B shows a dove prism that may be incorporated into some embodiments discussed herein;

FIGS. 8A-8B respectively show a side view and a top view of an optical system in accordance with some embodiments discussed herein;

FIGS. 9A-9C respectively show a side view, a top view, and a perspective view of an optical system in accordance with some embodiments discussed herein;

FIGS. 9D-9E show the relative positioning of a semi-reflective layer inside a double dove prism in accordance with some embodiments discussed herein;

FIG. 10 shows a prism that may be used in accordance with some embodiments discussed herein;

FIGS. 11A-11B show different views of a system that utilizes the prism of FIG. 10 in accordance with some embodiments; and FIG. 12 shows the system of FIGS. 11A and 11B being used to split and direct two separate initial light beams onto a single linear array of detector elements in accordance with some embodiments discussed herein.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments discussed herein enable precision target locating and designator systems to detect one or more designator spots on one or more targets. As used herein, a "target locator" differs from a "target designator" in that the target designator emits energy, such as an invisible laser beam, that can create a designator spot on a target, while a target locator cannot. Both a target designator and a target locater can be configured to function as a "designator spot imager." A designator spot imager, as referenced herein, generically refers to any apparatus, system and/or component that is configured to image a designator spot.

Figure 1A:
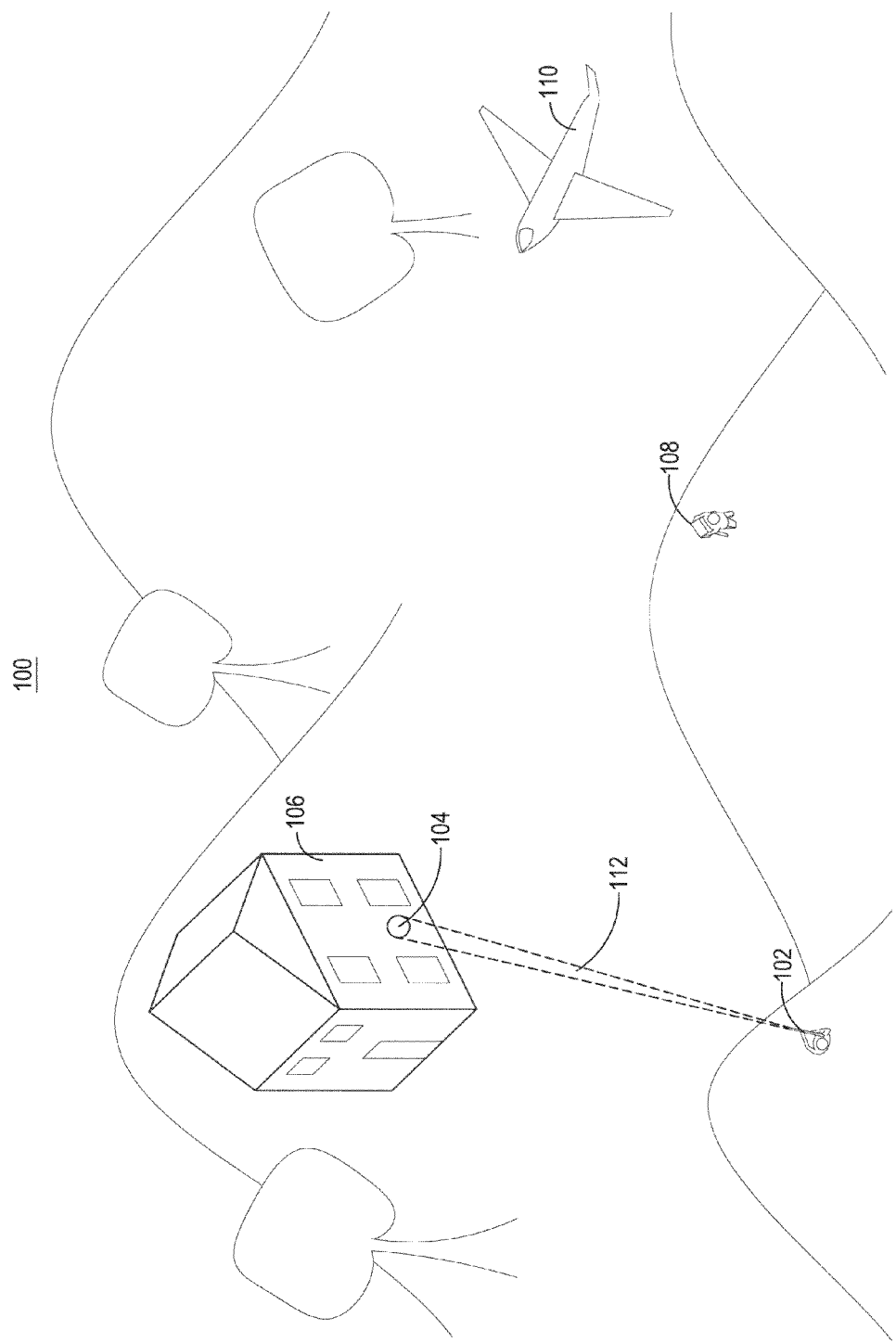
FIG. 1A shows a scene including a target designator creating a designator spot on a structure and a target locator being used to view the designator spot in accordance with some embodiments discussed herein.

FIG. 1A, for example, shows scene 100 including a person using target designator 102 to create designator spot 104 on target 106. Target designator 102 can, for example, generate laser beam 112 comprising one or more wavelengths of light. Laser beam 112 may be pulsed at one or more frequencies that are regular or irregular. In some embodiments, rather than or in addition to being handheld as shown in FIG. 1A, target designator 102 can be mounted on a tripod, an aircraft, a ground vehicle, and/or any other type of suitable apparatus. Laser beam 112 and, therefore, designator spot 104 can comprise visible and/or invisible radiation derived from energy of a laser that is subsequently reflected off target 106.

Figure 1B:
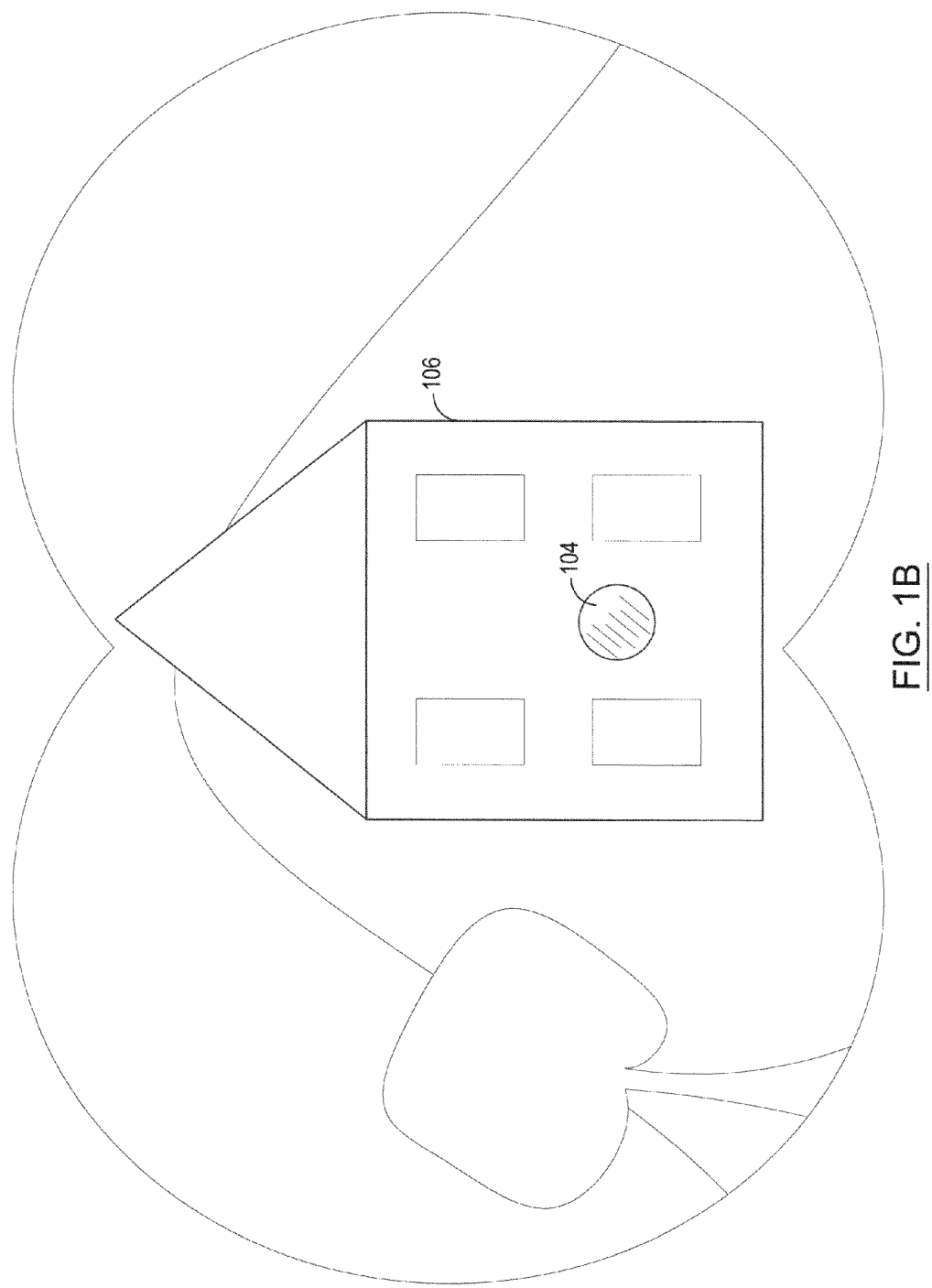
FIG. 1B shows an exemplary field of view of the designator spot imager incorporated in the target locator of FIG. 1A in accordance with some embodiments discussed herein.

Target designator 102 may also include one or more components configured to function as a designator spot imager. In addition to or instead of target designator 102 functioning as a designator spot imager, the location of designator spot 104 on target 106 can be observed and confirmed at a location remote from target designator 102 by using another device, such as handheld designator spot imager 108 or a designator spot imager incorporated into aircraft 110. FIG. 1B shows an image of scene 100 that may be generated and presented by designator spot imager 108. The image in FIG. 1B includes a visual representation of the field of view of designator spot imager 108 and designator spot 104 superimposed onto target 106.

Other examples of designator spot imagers include those that can be remotely controlled (e.g., directed or otherwise pointed at on one or more locations) and/or configured to wirelessly (or otherwise) provide data to a remote viewing station, such as a designator spot imager incorporated in a satellite, tripod mounted device, remote controlled vehicle and/or aircraft, among others. Each of these devices may be configured to display an image of the system's field of view of a scene, similar to or the same as that shown in FIG. 1B, locally and/or remotely from the designator spot imager.

An image, such as that shown in FIG. 1B, can result from a receiving designator spot imager receiving light from its field of view. Optics incorporated in the designator spot imager can direct and/or focus the received light onto one or more light sensitive sensors. The optics, in some embodiments, can be coated with and/or manufactured from one or more materials that cause one or more wavelengths of light to be attenuated or otherwise blocked (e.g., filtered). For example, one or more lenses, prisms, and other optical components can be coated with or manufactured from one or more materials that have a higher sensitivity to a particular designator spot's wavelength. Using such materials when manufacturing optics can allow the light sensitive sensors of the designator spot imager to be illuminated only or at least preferentially with light of the designator spot's wavelength.

An understanding of the developmental process may help one skilled in the art appreciate the problems that were overcome in realizing the technical improvements included in embodiments of the present invention. Initially, two different design approaches were considered for the design of the light sensitive sensor. The first approach was to use a quad detector. A quad detector has four individual detector elements arranged in a 2×2 array. This technique involves taking the sum and difference of the image (e.g., light intensity) detected by each of the elements to determine the x and y coordinates of the imaged designator spot within the detector's field of view. However, to determine both x and y coordinates of a designator spot, the quad detector approach sometimes requires the designator spot to be detected by at least a portion of all four detector elements. To meet this requirement, a design compromise can be made between the field of view of the designator spot imager and the image resolution (e.g., the minimum amount of designator spot movement that can be detected and identified). Hence, a solution that minimized these drawbacks was sought.

A second type of light sensitive sensor that was considered for use in some embodiments involved a charge-coupled device ("CCD"), such as those sometimes used in digital cameras, and other types of devices that have two dimensional arrays of thousands, even millions, of individual detector elements. The added number of detector elements should theoretically significantly increase the field of view to resolution ratio of the device. However, detector arrays that have that many detector elements, such as CCDs, are usually made from silicon. Designator spot imagers made from silicon often have low sensitivity to the 1.064 micron wavelength that is frequently used for designator laser beams. Thus, the use of silicon can significantly limit the performance of designator spot imagers.

Although some embodiments may utilize a quad detector and/or other type of two dimensional array (including those made from silicon), detector elements can instead or additionally be made from and/or coated with one or more different materials, such as InGaAs, that have a higher sensitivity to one or more particular wavelengths (such as the 1.064 micron wavelength) of light often emitted by designator lasers. By using InGaAs and/or other suitable materials, the detector arrays can have a higher field of view to resolution ratio when imaging one or more particular wavelengths of light commonly used by designator lasers.

While it is relatively expensive to fabricate two dimensional arrays from some types of materials (such as InGaAs), the cost of fabricating linear arrays from the relatively expensive materials are (at least currently) more comparable to the cost of fabricating two dimensional arrays from less expensive materials (such as silicon-based CCD arrays). As referenced herein, a "linear array" is a 1×N arrangement of detector elements that is non-rotationally symmetric. Each detector element is adapted to transform light of one or more ranges of wavelengths into electrical charges and/or signals that may be processed by electrical circuitry. For example, a linear array can be composed of individual detector elements that vary in number from N=256 to N=1024 elements, wherein each detector element can be adapted to enable a relatively high field of view to resolution ratio at one or more wavelengths and/or ranges of wavelengths of light. Also, as noted above, because linear arrays are less complex than, for example, two dimensional symmetrical arrays, linear arrays can be made more simply and more economically from materials with more expensive materials that have higher sensitivity to one or more specific designator wavelengths without drastically increasing the cost of the detector array. Another advantage of linear arrays, in accordance with some embodiments discussed herein, over two dimensional arrays is that fewer pixels are needed in a linear array than what would be needed to obtain the same precision with a two dimensional array. For example a system including a linear array, in accordance with some embodiments, may include an array having 256 linear detector elements for a total of 512 total pixels. While a two dimensional array system that provides comparable precision would have 256*256 or 65,536 pixels. Less pixels can also enable faster frame rates if the pixel processing time is constant.

Figure 2:
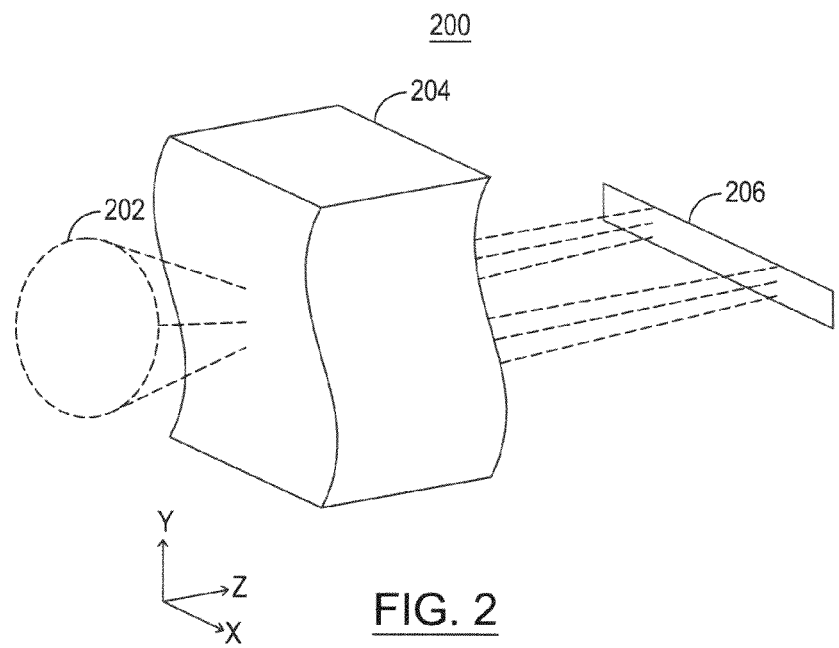
FIG. 2 shows an exemplary optical system that can image a multi-dimensional scene, such as that shown in FIG. 1B, using a single linear array of detector elements in accordance with some embodiments discussed herein.
Figure 3:
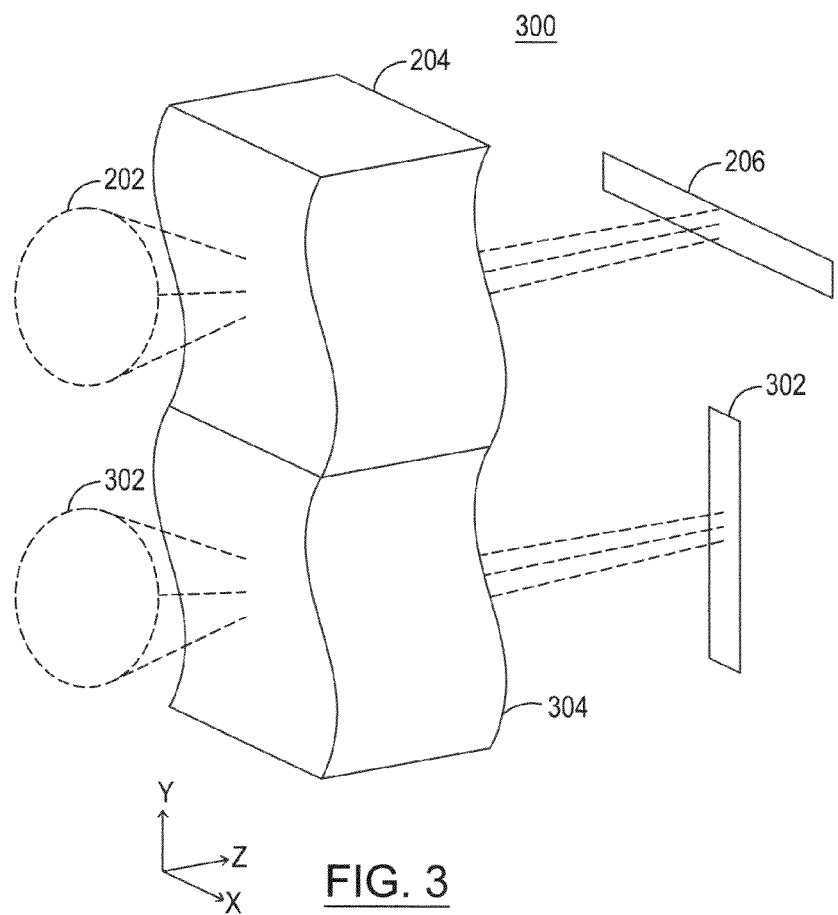
FIG. 3 shows another exemplary optical system that can image a multi-dimensional scene, such as that shown in FIG. 1B, using two linear arrays of detector elements in accordance with some embodiments discussed herein.

For example, FIGS. 2 and 3 show optical systems 200 and 300, respectively, which can include one or more sets of optical components and each can be used to identify the location of the designator spot onto a single coordinate axis. The optical system(s) can provide enough information to uniquely determine the location of the designator spot, such as designator spot 104 discussed above, in two dimensions relative to the Z-axis of the optical system.

Optical system 200, for example, receives light 202, and uses optical components 204 to direct the light onto linear detector array 206. Received light 202 can be light from within the field of view of optical system 200. For example, received light 202 can include light derived from a designator spot reflecting off a structure or other object.

To direct light onto linear detector array 206, optical components 204 can be adapted to focus, amplify and/or otherwise influence the path traveled by received light 202. Exemplary combinations of optics that can be included in optical components 204 are discussed further herein.

Linear detector array 206 can be, for example, a transducer that converts or otherwise transforms light energy of one or more wavelengths (including a range of wavelengths) into electrical energy. As noted above, linear detector array 206 can comprise any material, including relatively expensive materials, such as InGaAs, which are sensitive to one or more particular ranges of wavelengths of light. Linear detector array 206 can also be coupled to circuitry (not shown) that is configured to identify the location of a designator spot based on the electrical outputs of linear detector array 206 and/or one or more other components (that are not shown, such as a CCD configured to visually image a field of view of a scene).

For example, optical system 200 can be pointed or otherwise "aimed" in a given direction and receive light from the field of view of optical system 200. The received light can include energy having one or more ranges of wavelengths from one or more angles. Optical system 200 can then filter the light based on wavelength, and direct the light to a portion of linear detector array 206 that corresponds to the angle at which the light initially entered optical components 204.

The angle at which the light initially enters optical components 204 and, more generally, optical system 200, is sometimes referred to herein as the "initial angle of incidence." The specific location or locations where one or more beams of light exit optical components 204 can correspond with the beams' of light initial angle(s) of incidence. Linear detector array 206 can then receive the light exiting optical components 204 and the initial angle of incidence can be determined by circuitry (not shown) coupled to the linear detector array 206. The circuitry can, for example, relate each detector element of linear detector array 204 with a corresponding initial angle of incidence.

The initial angle of incidence is related to where light 202 physically enters the field of view of optical system 200 and can be referred to using Cartesian coordinates in two dimensional space (X, Y). For example, received light 202 having a zero angle of incidence enters from the center of optical system 200's field of view, and can be referred to using Cartesian coordinates (0, 0). After traveling through and being influenced by optical components 204, the light exiting optical components 204 can shine on two or more detector elements associated with (0, 0). Discussed below are additional examples of how light can be diverted and influenced by optical system 200, and used to illuminate two or more specific portions of linear detector array 206 that correspond with the initial angle of incidence. In this manner, the optical system 200 can be used to locate and/or image at least one designator spot relative to the field of view of optical system 200. The field of view may vary as optical system 200 is redirected or aimed elsewhere.

In some embodiments, such as those consistent with FIG. 2, optical components 204 can influence received light 202 and output at least two beams of light. The first beam of light can represent the angle of incidence relative to the X-axis (X-axis coordinate) of optical system 200's field of view and the second beam of light can represent the angle of incidence relative to the Y-axis (Y-axis coordinate) of optical system 200's field of view. As a result, a single linear array of detector elements, such as linear detector array 206 can be used to identify and image at least one designator spot in two-dimensional space relative to the direction at which optical system 200 is being aimed. In some embodiments, a range finder and/or other circuitry can also be incorporated into optical system 200 to enable optical system 200 to determine distance (using e.g., a range finder, a digital magnetic compass, global positioning unit, and/or other data) for three-dimensional imaging.

FIG. 3 shows optical system 300, which includes two sets of optical components, namely optical components 204 and 304, and two linear arrays of detectors, namely linear detector arrays 206 and 306, to image two orthogonal planes (X-plane and Y-plane) in accordance with some embodiments.

Optical components 204 can comprise the same or similar optics as optical components 304. In some embodiments, for example, optical components 204 are the same as optical components 304, except optical components 304 are rotated (e.g., 90 degrees) relative to optical components 204. Additionally, optical components 204 can anamorphically compress one planar axis of the scene, and optical components 304 can anamorphically compress an orthogonal planar axis. For example, rather than or in addition to optical components 204 influencing light such that linear detector array 206 receives both X-axis and Y-axis beams of light, optical components 204 can be adapted to only influence received light 202 such that linear detector array 206 receives a beam of light representing the angle of incidence only along the X-axis of optical components 204. Optical components 304 can be adapted to influence received light 302 such that linear detector array 306 receives a beam of light representing the angle of incidence along the Y-axis of optical components 304. The electrical outputs of linear detector arrays 206 and 306 can then be collectively processed by one more sets of circuitry to determine the location of a designator spot relative to the field(s) of view of optical components 204 and 304, which may be related to the direction in which optical system 300 is being pointed. Although FIG. 3 shows the received light 302 as being independent of received light 202, light may be received by a telescope or other component (not shown) of optical system 300, and directed to a beam splitter and/or other optical component(s) that can divide and/or redirect the initially received light to each of optical components 204 and 304.

FIGS. 4A and 4B respectively show a side view and a top view of optical system 400 used to direct received light 402 onto linear detector array 206. For example, received light 402 can include radiating energy, such as reflected light from a designator spot.

Optical system 400 is an anamorphic relay system. Optical system 400 can be configured to balance the aperture size and the field of view with the required aspect ratio of linear array 404. Linear array 404 can be the same as or similar to the linear detector arrays discussed elsewhere herein. Furthermore, optical system 400 can include focal planes that are coincident.

The basic layout of optical system 400 includes a first group of optical elements, group 406, a second group of optical elements, group 408, and a third group of optical elements, group 410. Each of these groups of optical elements can be enclosed by one or more housings and/or other types of enclosures (not shown).

Light enters optical system 400 via group 406. Group 406 may include two spherical elements forming a positive objective. Group 406 may function as a telescope that focuses and/or magnifies the light as the light initially enters optical system 400.

Light may then travel to group 408. Group 408 may include two cylindrical optics that provide optical power in opposite planes. The first optical element of group 408 is shown in FIG. 4B as including a radius of curvature. (The drawings are not necessarily to scale or proportional, and are meant to show features of exemplary embodiments that those skilled in the art would appreciate. For example, the magnitude of the radius has be exaggerated FIG. 4B.) One optic of group 408 can be negative and extend the position of the objective focal plane to the linear array. The second optic of group 408 can be positive and reduce the focal length of the objective. One purpose of group 408 is to separate the orthogonal foci of objective group 406. Additionally, group 408 optical elements can decrease the magnitude of the relay reduction necessary by group 410. FIG. 4A also shows the intermediate focus produced by group 408 prior to the light beam(s) reaching group 410.

Group 410 may be the last group of elements the light travels through before reaching linear array 404. Group 410 may contain two positive cylindrical lenses whose optical powers are aligned in the same plane. At least one purpose of group 410 may be to relay the intermediate image formed from the positive cylindrical element of group 408.

In some embodiments, in accordance with FIG. 3, optical system 400 can be modified to include a second set of optical elements (not shown). For example, a beam splitter (not shown) can be included in optical system 400. The beam splitter may be placed between group 406 and group 408, and used to divert light to both group 408 and to the second set of optical groups (not shown). With a beam splitter, optical system 400 would include as little as 11 optics (including the beam splitter) and two linear arrays, and be enabled to determine both X-coordinates and Y-coordinates of, for example, a designator spot's location. The second set of optical elements may include two or more additional groups of optics that are similar to groups 408 and 410. The additional groups of optics (not shown) can, for example, be the same as those included in groups 408 and 410, but oriented 90 degrees relative to groups 408 and 410.

The additional groups of optics (not shown) can enable optical system 400 to determine the location of a designator spot in two dimensions using two linear arrays of detector elements. One potential consequence of embodiments in accordance with those shown in FIGS. 4A and 4B is boresight sensitivity. A boresight error may be induced as a result of a shift of the linear array (the shift being with respect to the optical axis) while imaging using both orthogonal planes. Furthermore, the sensitivities to boresight may be proportional to magnification ratio of the two incoming orthogonal planes, such as the X-axis plane and the Y-axis plane, associated with the received light.

In some embodiments, a second design approach shown in FIGS. 5A and 5B can be employed to reduce the number of required optical elements and the boresight sensitivity of the short axis as compared to optical system 400. FIGS. 5A and 5B show optical system 500, which includes at least some components that are similar to or the same as those discussed in connection with optical system 400, as well as cylindrical field lens 502.

Figure 6D:
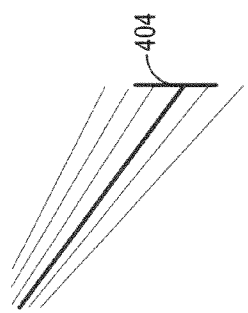
Figure 6E:
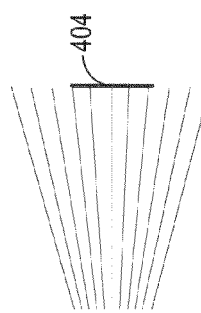
Figure 6F:
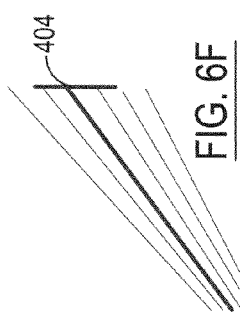
Figure 6A:
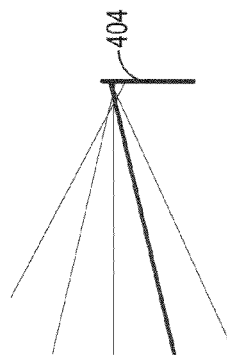
Figure 6B:
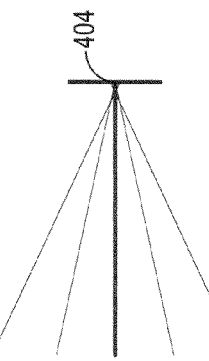
Figure 6C:
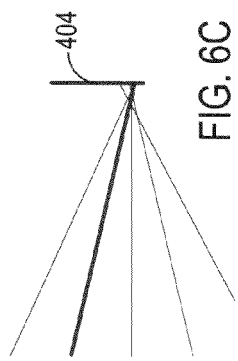

Field lens 502 may be configured to produce a uniform distribution of rays from all fields across the entire detector aperture. FIGS. 6A-6F show how light having three different angles of incidence may be distributed by an anamorphic relay (such as those discussed in connection with FIGS. 4A and 4B) and by a field lens (such as field lens 502). FIGS. 6A-6C are the result of an anamorphic relay receiving light from the left of the center of the field of view (FIG. 6A), from the center of the field of view (FIG. 6B), and from the right of the center of the field of view (FIG. 6C). FIGS. 6D-6F are the result of a field lens receiving light from the left of the center of the field of view (FIG. 6D), from the center of the field of view (FIG. 6E), and from the right of the center of the field of view (FIG. 6F).

As shown by FIGS. 6D-6F, field lens 502 can aid in eliminating the correlation of field with spatial position at linear array 404. Unlike the anamorphic relay design of optical system 400 shown in FIGS. 4A and 4B, which images the same conjugate plane for both axes, field lens 502 of system 500 images the entrance pupil onto linear array 404 in the short axis (e.g., the height of an individual pixel). In the long axis (e.g., the dimension that spans the full linear array), field lens 502 has no power and does not disrupt the correlation between field and spatial position which is necessary for tracking.

In some embodiments, such as those in accordance with FIG. 3, field lens 502 may be included as a practical design option to reduce the total number of optical elements for a complete system to 4 optical elements, two linear arrays of detector elements, and a beam splitter. The beam splitter that may be, for example, between group 406 and field lens 502 may direct the light, similar to that shown in FIG. 3, to a second field lens and a second linear array. The second field lens (not shown) may be oriented 90 degrees relative to field lens 502. Using four optics, including two field lenses, and two linear arrays of detector elements, optical system 500 may be used to image a detector spot in two dimensional space.

While a number of benefits may be realized from previously described embodiments that include two linear arrays of detector elements to image a two dimensional space, the design approaches of optical systems 400 and 500 are shown as being one of two optical channels, with each channel including a linear array of detector elements. But, requiring two linear arrays (one for each optical channel) adds cost, electronic complexity, physical volume and weight. Therefore, in addition to reducing the number of optical, it may be desirable for some embodiments to use a single linear array of detector elements for both optical channels (as opposed to a first linear array dedicated to determining the X-axis coordinate of received light and a second linear array dedicated to determining the Y-axis coordinate of received light).

FIG. 7A-11B show exemplary methods, optical components, systems and other means for redirecting received light onto a single linear array for imaging two dimensional space, which are in accordance with some embodiments such as FIG. 2. FIG. 7A shows process 700 that starts at 702.

At 704, a beam of light is received. The beam of light can comprise, for example, light having one or more wavelengths and/or one or more ranges of wavelengths that previously passed through a light filter. The received beam of light can also be pulsating at one or more frequencies. The received light can include reflected light from a designator spot.

At 706, the received light beam is split into two light beams having the same or approximately equal intensity. A beam splitter or other type of optic(s) can be used to split the light beam.

At 708, one of the two split beams of light is rotated 90 degrees relative to the other split beam of light. A dove prism (such as dove prism 730 shown in FIG. 7B), a double dove prism (shown in FIGS. 8A-9E), and/or other type of optic(s) can be used to rotate one of the split beams of light 90 degrees. In some embodiments, rather than rotating one split beam of light 90 degrees, each split beam of light may be rotated in opposite directions such that their total relative rotation equals 90 degrees. For example, each split beam of light can be rotated 45 degrees in opposite directions, causing a 90 degree rotational difference between each of the split beams of light. Similarly, one split beam of light may be rotated 30 degrees with the second split beam of light being rotated 60 degrees in the opposite direction, or any other combination thereof. In other embodiments, the rotational difference between each of the split beams of light may be more than or less than 90 degrees.

After rotation, the split beams of light are arranged at 710 to be parallel and displaced relative to each other. In some embodiments, the magnitude of displacement can be equal to or greater than the distance the field subtends at the focal plane. At 712, the relative-rotated, split beams of light are outputted. For example, the split beams of light are shined onto a linear array of detector elements. In some embodiments, the linear array may include at least twice as many detector elements than that included in a linear array used with a dual-linear array approach, such as those discussed in connection with optical systems 300, 400 and 500.

At 714, circuitry can determine onto which detector element(s) each beam of light is being shined. The circuitry can be hardwired to execute its functionality, access code stored on a non-transitory storage medium, and/or otherwise be implemented as a machine that is able to make determinations and/or perform other functions. For example, the circuitry may be a processor or other computing device that is configured to perform or cause to be performed the functions and operations described herein.

The circuitry can determine at 716 an X-axis coordinate based on where one of the split beams of light is shined onto the linear array of detector elements. At 718, the circuitry can determine a Y-axis coordinate based on where the other of the split beams of light is shined onto the linear array of detector elements. For example, the circuitry may associate one or more detector elements with the zero value on the X-axis (sometimes referred to herein as the "X-axis detector element"), and one or more other detector elements of the linear array with the zero value on the Y-axis (sometimes referred to herein as the "Y-axis detector element"). When the light is shined onto these two detector elements, the circuitry can be configured to determine the light is entering at the coordinates (0, 0) with a zero angle of incidence and, therefore, is originating from a location directly in front of where the optical system is being aimed and is entering the system from the center of the system's field of view. The detector element on one side of the X-axis detector element can be associated with an X-coordinate of 1, and the detector element on the other side of the X-axis detector element can be associated with an X-coordinate of −1. The associated values may increase (or decrease) with the distance of the detector element from the X-axis detector element. A similar relative determination may be made in connection with the Y-axis coordinate.

After determining the values of the (X, Y) coordinates based upon the relative distance from the X-axis and Y-axis detector elements, the circuitry may generate at 720 an image of the designator spot within the optical system's field of view. The image can, in some embodiments, be limited to one or more wavelengths of light (or ranges of wavelengths of light that are able to pass through the wavelength and/or other types of filters) and/or light pulsating at one or more regular or irregular frequencies.

The image may then be processed by the circuitry at 722. For example, the image may be saved, displayed by itself, and/or integrated into another image that includes other image data (e.g., such as visual image data that may have been filtered out). Process 700 ends at 724.

FIGS. 8A and 8B show various views of one example of an optical system, optical system 800, that can implement a process similar to or the same as process 700 and create a unique two dimensional location of the designator spot using a single linear array of detector elements. Optical system 800 includes a beam splitting prism, namely double dove beam splitter 802, which can be used to split the incoming beam of light, rotate one split beam of light with respect to the other, and arrange the two split beams of light to be parallel and displaced. Double dove beam splitter 802 can be formed or otherwise take the shape of two separate dove prisms (such as that shown in FIG. 7B) which are joined at their base. The double dove prism can take the shape of a three dimensional hexagon, as shown in FIGS. 8A and 8B. At the junction of the bases of each dove prism (or otherwise embedded within the center of double dove beam splitter 802), a semi-reflective coating can be placed to form the basis of the beam splitter.

As noted in connection with FIG. 7B, a dove prism includes the unique optical property that produces a rotation in the image that is equal to twice the rotation of the prism.

Additionally, as shown in FIGS. 8A and 8B, double dove beam splitter 802 can be physically rotated 45 degrees relative to the other optics of optical system 800. The rotated orientation of double dove beam splitter 802 can cause entrance light beam 804 to be rotated 90 degrees and be split into beams 806, 808 that are shown exiting double dove beam splitter 802.

For example, in double dove beam splitter 802, there is a reflected beam 806 and a transmitted beam 808. Reflected beam 806 can propagate in the same manner as a beam in a single dove prism. This can cause reflected beam 806 to rotate twice the angle that the entire prism is rotated. Transmitted beam 808 propagates the same as or similar to how a beam of light may propagate through the prism or a parallel plate optic. Transmitted beam 808 may not undergo any rotation but can be displaced relative to reflected beam 806. The net effect is that when double dove beam splitter 802 is rotated 45 degrees relative to the other optics of optical system 800, double dove beam splitter 802 splits entrance light beam 804 into two parallel but displaced exit beams, beams 806 and 808, which are rotated 90 degrees and displaced with respect to each other.

Additionally, in some embodiments, double dove beam splitter 802 can cause both beams 806 and 808 to experience a significant amount of astigmatism when the prism is used in converging light. Since the astigmatism is in a plane that is rotated 45 degrees with respect to the exiting beams, it can be removed in some embodiments by "wedging" the orientation of the exit face relative to the entrance face of the prism. This prism geometry can cause the exit beams 806, 808 to no longer propagate in a parallel direction. The beams can be redirected, however, with the use of small wedged prisms, such as Risleys prism 810. Risleys prism 810, in some embodiments, may not significantly re-introduce astigmatism since their angle of incidence can be relatively small (e.g., less than 5 degrees).

Although the double dove beam splitting prism approach is relatively optically efficient in its number of optical elements, fabricating the prism may create potential issues and/or involve a relatively complex process. For example, one way to minimize the size of a double dove beam splitting prism for a given beam displacement distance, can involve maximizing the index of refraction. Maximizing the index of refraction can lead to a condition where the junction of the prisms should be optically contacted since the inclusion of an adhesive at the boundary may introduce total internal reflection. If the prism is made from a material with a low enough index of refraction to eliminate total internal reflection from an adhesive, the prism may need to be made substantially larger than desired for some embodiments, such as those being implemented as handheld designator spot locators. Furthermore, since space may be needed between the exit face of the prism and the focal plane (to, e.g., insert the Risleys and cylindrical field lenses into optical system 800), the double dove beam splitting prism must be moved closer to the objective. This may also cause the required size of the prism to be too large for some embodiments, because the entrance face of the double dove beam splitting prism should be physically large enough to accommodate a relatively larger entrance beam.

Some embodiments, such as optical system 900 shown in FIGS. 9A-9C, can include double dove beam splitter 902 that can be manufactured from a lower index material than double dove beam splitter 802, while still allowing double dove beam splitter 902 to provide the necessary beam displacement and separation between the exit face and the focal plane of double dove beam splitter 902. To aid in the use of double dove beam splitter 902, system 900 may include spherical negative lens 904, which receives entrance light beam 804 prior to double dove beam splitter 902. Negative lens 904 can be configured to provide the proper power to re-collimate the converging beam from the objective lens of group 906. Group 906 and negative lens 904 can form an afocal telescope. Because negative lens 904 can cause entrance beam 804 to be collimated prior to entering double dove beam splitter 902, double dove beam splitter 902 may not require astigmatism correction. Double dove beam splitter 902 can be utilized without a wedge prism or Risleys prism, because exit beams 908, 910 may exit parallel to each other.

Although a wedge or Risleys prism may not be included in optical system 900, positive spherical lenses 912, 914 may be included after the exit face of double dove beam splitter 902 to refocus the beams. The focal length of positive spherical lenses 912, 914 can be configured to be equal to the original focal length of the objective divided by the reduction factor of the afocal telescope.

FIGS. 9D and 9E show an example of where a semi-reflective layer, shown as semi-reflective layer 916, may be located within double dove beam splitter 902. Double dove beam splitter 902 can comprise a height, a length, and a width as shown in FIGS. 9D and 9E. The height of double dove beam splitter 902 can be defined by a first distance between two parallel sides of a hexagonal face of double dove beam splitter 902. The length can be defined by a second distance between two opposite vertices of the same hexagonal face, where the vertices are formed by different sides of double dove beam splitter 902 and are therefore independent of the two parallel sides that define the height. The width of double dove beam splitter 902 can be defined by a thickness of the prism as shown in FIG. 9D.

Semi-reflective layer 916 can likewise comprise a layer height, a layer length, and a layer width. The layer width of semi-reflective layer 916 can be defined by (e.g., the same as or and/or substantially the same as) the width of the double dove beam splitter 902. The layer length of semi-reflective layer 916 can be defined by (e.g., the same as or and/or substantially the same as) the length of the double dove beam splitter 902. The layer height of semi-reflective layer 916, as shown in FIG. 9E, can be a fraction of the height of the double dove beam splitter 902 (e.g., less than 1 micrometer). In some embodiments, such as those shown in FIGS. 9D and 9E, the layer height's center aligns at or near the height's center.

One potential disadvantage to some embodiments using an afocal double dove approach is the overall length of the optical system. When the beam is collimated (by, e.g., negative lens 904) before entering an afocal double dove beam splitter, the overall length of the optical system may be extended by approximately the length of the double dove beam splitter prisms. Another potential disadvantage may apply to both focal and afocal double dove embodiments. The exit beams from a double dove beam splitter prism may not be displaced in only the intended plane (e.g., the Y-axis plane) but may be displaced an equal amount in an intersecting plane (e.g., the X-axis plane). This potential disadvantage of using double dove beam splitter prisms in some embodiments may double the condensing factor of the cylindrical field lens and complicate its design. The following design, discussed in connection with FIGS. 10 and 11A-11B, may be used in accordance with some embodiments and address these potential issues associated with double dove beam splitter prisms.

FIG. 10 shows prism 1000. Prism 1000 may be comprised of and/or optically function as a cube beam splitter prism 1002 and two right angle prisms 1004, 1006. Prism 1000 may be configured to rotate a beam of light 90 degrees with the two right angle reflections of right angle prisms 1004 and 1006.

The reflections may be orientated in orthogonal planes by prism 1000. Using this principle, the optical functions discussed above, including splitting, displacing, and rotating, may be realized by prism 1000.

As was the case with the double dove beam splitter prisms discussed above, entrance light beam 1008 can be split into exit beams 1010 and 1012. Exit light beams 1010 and 1012 can be equally displaced in two separate planes. Light beams 1010 and 1012 can be recombined into one axis and shined onto the same linear array of detector elements with the use of two rhomboid prisms. FIGS. 11A and 11B, for example, show rhomboid prisms 1102 and 1104 coupled to and/or otherwise incorporated into prism 1000. Two rhomboid prisms 1102 and 1104 can be used in some embodiments instead of one rhomboid prism to maintain equal path lengths of exit light beams 1010 and 1012. After recombining the beams in the one axis, a cylindrical field lens, such as lens 1106, can be used to condense the beams onto linear array 1108. Because the beam splitting, rotating, displacing, and recombining may all occur in focused space, the overall length of optical system 1100, including the optical elements of group 1110, can be shorter than a comparable afocal, double dove system, such as those discussed above.

FIG. 12 shows a portion of optical system 1100 receiving two beams of light 1202, 1204. Each beam of light 1202 and 1204 may correspond with, for example, a designator spot reflecting off one or more structures. While each beam of light 1202, 1204 may have the same or similar wavelength, beam of light 1202 may be differentiated from beam of light 1204 based on pulse frequency and/or some other optical characteristic(s). In some embodiments, each beam of light 1202, 1204 can have a different wave length and/or the same pulse frequency or no pulse frequency.

For example, beam of light 1202 may have the coordinates (0, 0) based on the field of view of optical system 1100, while beam of light 1204 may have coordinates (7, 5) based on the same field of view. Upon entering prism 1000, beams of light 1202, 1204 may both be split into two separate beams (for a total of four beams). For example, beam of light 1202 can be split into a first beam of light that corresponds with beam of light 1202's X-coordinate (0), and a second beam of light that corresponds with the beam of light 1202's Y-coordinate (0). Similarly, beam of light 1204 can be split into a first beam of light that corresponds with the beam of light 1204's X-coordinate (7) and a second beam of light that corresponds with the beam of light 1204's Y-coordinate (5). Upon exiting rhomboid prisms 1102 and 1104, the different vector components can cause each beam of light to enter different locations of lens 1106 and illuminate different detector elements of linear array 1108.

As noted above, each detector element of linear array 1108 can be associated with a relative position of the system's field of view. Circuitry can access an electronically stored map and/or other data structure that relates each detector element to a relative position of the system's field of view. In addition to or instead of relative positioning and/or location data, the circuitry can be configured to derive other types of data from the outputs of linear array 1108. For example, the circuitry can determine which detector elements are being illuminated, the illumination frequency of each detector element, the wavelength(s) or range of wavelengths received by each detector element, among other characteristics of the light shining on linear array 1108. The circuitry can then use the data derived from the outputs of linear array 1108 to associate each X-coordinate with the proper Y-coordinate, and generate a multi-dimensional image showing the relative location and/or shape of, among other things, one or more designator spots.

For example, the circuitry can present an image that includes designator spots and their relative location based on light beams 1202 and 1204.

The processing circuitry may also receive data from one or more other imaging components (such as a CCD), wherein the additional data may be associated with visible or other type of light (e.g., infrared). The additional data can then be processed in conjunction with the linear array's data, and an image can be produced that shows the location of the designator spot on a target using a human-viewable display.

As briefly noted above, according to some exemplary aspects of embodiments, the processing circuitry may include a processor that operates under control of a computer program product and be used to control mechanical components and/or process light signals received from one or more sets of optics. For example, a visible signal can be received from one set of optics while an invisible signal is received from another. Each set of optics may direct light onto a dedicated light sensor (such as visible light sensor and an invisible light sensor). The processing circuitry may receive the outputs of these sensors and access memory that stores one or more application programs or other software executed by the processor to control the operation of the device. For example, a computer program product can be implemented on a tangible, non-transitory computer-readable storage medium, such as non-volatile storage medium, and software embodied in the computer-readable storage medium.

As will be appreciated, any such computer program instructions may be loaded onto a computer or other programmable apparatus, e.g., the processor, to produce a machine, such that the instructions which execute on the computer or other programmable apparatus create means for implementing the functions described herein. These computer program instructions may also be stored in a computer-readable memory that may direct a computer or other programmable apparatus to function in a particular manner, such that the instructions stored in the computer-readable memory produce an article of manufacture including instruction means which implement the functions described herein. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An optical system, comprising:
   an optical element configured to:
   receive an entrance beam of light;
   split the entrance beam of light into at least a first split beam of light and a second split beam of light;
   rotate the second split beam of light; and
   output the first split beam of light and the second split beam of light; and at least one linear array of detector elements that is configured to receive the first split beam of light and the second split beam of light.

2. The optical system of claim 1, wherein the optical element is further configured to displace the first split beam of light from the second split beam of light.

3. The optical system of claim 2, wherein the optical element is further configured to displace the first split beam of light and the second split beam of light such that the first split beam of light is parallel to the second split beam of light.

4. The optical system of claim 1, wherein the optical element comprises a double dove splitting prism.

5. The optical system of claim 4, wherein the double dove splitting prism includes a layer of semi-reflective material.

6. The optical system of claim 1, wherein the optical element comprises a cube beam splitter prism adjoined to two right angle prisms.

7. The optical system of claim 6, wherein the prism also includes two rhomboid prisms, wherein each of the rhomboid prisms is adjoined to one of the right angle prisms.

8. The optical system of claim 1, wherein the at least one linear array of detector elements comprises:
a first linear array of detector elements and a second linear array of detector elements, wherein the first linear array of detector elements receives the first split beam of light, and wherein the second linear array of detector elements receives the second split beam of light.

9. The optical system of claim 1, wherein the at least one linear array of detector elements comprises only a single linear array of detector elements that receives the first split beam of light and the second split beam of light.

10. The optical system of claim 1 further comprising circuitry configured to:
receive one or more outputs from the at least one linear array of detector elements; and
generate two dimensional image data based on the one or more outputs.

11. The optical system of claim 1 is a handheld system.

12. The optical system of claim 1, wherein the optical element is further configured to direct the first split beam of light and the second split beam of light to a portion of the linear array of detector elements that corresponds to an angle at which the beam of light initially entered the optical element.

13. A method, comprising:
receiving an entrance beam of light;
splitting the entrance beam of light into at least a first split beam of light and a second split beam of light;
rotating the second split beam of light;
outputting the first split beam of light and the second split beam of light; and
upon outputting the first split beam of light and the second split beam of light, directing the first split beam of light and the second split beam of light onto at least one linear array of detector elements.

14. The method of claim 13 further comprising displacing the first split beam of light from the second split beam of light.

15. The method of claim 14, wherein the first split beam of light is displaced parallel from the second split beam of light.

16. The method of claim 13, wherein directing the first split beam of light and the second split beam of light onto at least one linear array of detector elements comprises:
directing the first split beam of light onto a first linear array of detector elements; and
directing the second split beam of light onto a second linear array of detector elements.

17. The method of claim 13, wherein directing the first split beam of light and the second split beam of light onto at least one linear array of detector elements comprises:
directing the first split beam of light onto a first linear array of detector elements; and
directing the second split beam of light onto the first linear array of detector elements.

18. The method of claim 13 further comprising:
transforming, using the at least one linear array of detector elements, the first beam of light into a first electrical signal;
transforming, using the at least one linear array of detector elements, the second beam of light into a second electrical signal; and
outputting the first electrical signal and the second electrical signal.

19. The method of claim 18 further comprising:
receiving the first electrical signal and the second electrical signal;
processing the first electrical signal and the second electrical signal; and
generating multi-dimensional image data based on the first electrical signal and the second electrical signal.

20. The method of claim 19 further comprising:
displaying the multi-dimensional image data, wherein the multi-dimensional image data includes at least one visual indication of at least one invisible designator spot.

21. The optical system of claim 1, wherein the optical element is further configured to split the entrance beam of light into the first split beam of light that represents a X-axis coordinate of an angle at which the entrance beam of light initially entered the optical element and into the second split beam of light that represents a Y-axis coordinate of the angle at which the entrance beam of light initially entered the optical element.

22. An optical system, comprising:
an optical element configured to:
receive an entrance beam of light at an angle of incidence;
split the entrance beam of light into at least a first split beam of light that represents a X-axis coordinate of the angle of incidence and a second split beam of light that represents a Y-axis coordinate of the angle of incidence; and
output the first split beam of light and the second split beam of light; and
at least one linear array of detector elements that is configured to receive the first split beam of light and the second split beam of light.

* * * * *